Patented Oct. 30, 1951

2,573,015

UNITED STATES PATENT OFFICE 2,573,015

BASIC ESTERS OF 1-ARYL-CYCLOPENTENE-(3)-1-CARBOXYLIC ACIDS

Franz Häfliger, Basel, and Rolf Denss, Zurich, Switzerland, assignors to J. R. Geigy A. G., Basel, Switzerland No Drawing. Application November 4, 1948, Serial No. 58,358. In Switzerland December 24, 1947

6 Claims. (Cl. 260—294.3)

The present invention is concerned with new basic esters and amides of 1-aryl-cyclopentene-(3)-1-carboxylic acids, having the general formula I

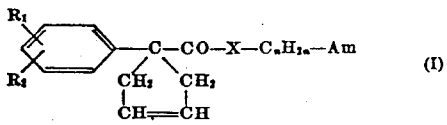

and their salts, as well as the 1-aryl-cyclopentene-(3)-1-nitriles serving as intermediate products.

In the above formula and in those which follow—

$R_1$ and $R_2$ each stand for a hydrogen atom, a halogen atom, a methyl or methoxy group or $R_1$ and $R_2$ joined together stand for a tri- or tetramethylene chain. Radicals corresponding to the definition of

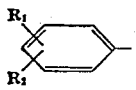

are thus, for example: phenyl; 2-, 3- and 4-methyl-phenyl; 3,4-, 2,4- and 2,5-dimethyl-phenyl as well as other isomers; tetralyl-5 and -6; indanyl-5; 4-chlorophenyl; 3,4-dibromo-phenyl; 2-, 3- and 4-methoxy-phenyl; 3,4-dimethoxy-phenyl and isomers; 3-methyl-4-methoxy-phenyl and isomers; 4-isopropoxy-phenyl; 2-ethoxy-phenyl, X stands for an oxygen atom, an imino, methyl-imino or ethylimino group $n$ stands for a whole number between 2 and 6 inclusive; thus —$C_nH_{2n}$— stands for a bivalent, aliphatic hydrocarbon radical, e. g.,

—CH₂—CH₂—; —CH₂—CH₂—CH₂—

—CH₂—CH₂—CH₂—CH₂—CH₂—CH₂—

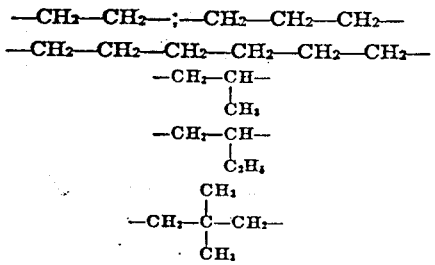

or

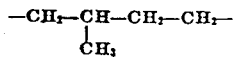

Am stands for the radical of a non-aromatic, secondary amine. In particular, Am includes the radicals

and —NR''', where

R' and R'' each stand for a lower alkyl radical, preferably containing 1-2 carbon atoms, R''' stands for a bivalent aliphatic radical, which can also contain an oxygen atom as a chain member, has preferably 4 or 5 members in the chain and contains 4 to 6 carbon atoms.

Radicals corresponding to this definition of Am are, for example, tho е derived by removal of the hydrogen atom bound to the nitrogen atom of dimethyl-, diethyl-, dipropyl-, di-iso-propyl-, di-allyl-, methyl-ethyl- or methyl-propylamine, piperidine, pyrrolidine or morpholine.

Benzyl cyanide has been converted to 1-phenyl-cyclopentane-1-nitrile by the interaction of 1,4-dibromo-butane and sodium amide and the nitrile then hydrolysed to give 1-phenyl-cyclo-pentane-1-carboxylic acid (F. H. Case, J. of Am. Chem. Soc., 1934, 56, 715). Likewise, it is known how to prepare basic esters and amides of 1-aryl-cyclopentane-1-carboxylic acids (U. S. Patents 2,404,588 and 2,437,545).

However, corresponding derivatives of a 1-aryl-cyclopentene-1-carboxylic acid have been unknown up till now. It was also unexpected to find that 1-aryl-cyclopentene-(3)-1-nitriles can be prepared from arylacetonitriles and 1,4-dihalogen-butene-2, since it is known that 1,4-dihalogen-butene-2 is not suitable for ring-closure.

The surprising discovery has now been made that 1,4-dihalogen-butene-2 can be successfully condensed with arylacetonitriles to give 1-aryl-cyclopentene-(3)-1-nitriles.

The condensation is carried out in the presence of an agent which splits off hydrogen halide. It is preferable to use those agents which can form a metal derivative of the aryl-acetonitrile. Generally, there come into consideration: alkali metals and active alkali compounds, such as sodium amide, potassium amide, phenyl sodium, phenyl lithium and potassium-tert. butylate. The reaction takes place under very mild conditions with finely divided sodium amide, so that we prefer to use it, not only because of this advantage but also because of its low price.

A preferred method of carrying out the process consists in gradually mixing a solution of approximately equimolecular quantities of 1,4-dihalogen-butene-2 and of arylacetonitrile in an inert solvent such as benzene or ether, at about 0° C. with roughly two mols of finely divided sodium amide.

It is advantageous to use 1,4-dichloro- or 1,4-dibromobutene as 1,4-dihalogen-butene-2. As second component any arylacetonitrile comes into consideration, as long as it does not contain substituents which themselves react with 1,4-dihalogen-butene-2 and sodium amide. It is preferred to use arylacetonitriles corresponding to the formula

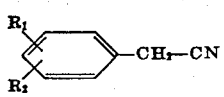

The 1-aryl-cyclopentene-(3)-1-nitriles obtained can be hydrolysed to give the corresponding carboxylic acids. For this purpose it is advantageous to heat the nitriles with an alcoholic or aqueous alcoholic solution of an alkali hydroxide in a closed vessel at about 150° C.

The new nitriles and carboxylic acids are used as intermediate products in the manufacture of the basic esters and amides described in the present specification. Since their molecule is capable of reaction at two points however, they may also be used as starting point for many further syntheses.

The basic esters and amides of Formula I are obtained from the 1-aryl-cyclopentene-(3)-1-carboxylic acids and their derivatives (Formula II) by reaction with an amine of Formula III, as follows:

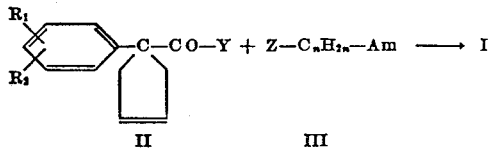

II      III

Y and Z denote radicals which split off in the reaction with the exception of a bivalent radical —O—, —NH—, or —N(alkyl)— contained in either one of them.

In accordance with the above, for example, a 1-aryl-cyclopentene-(3)-1-carboxylic acid (II, Y=OH) or (usually with more advantage) its reactional functional derivatives, such as acid halides, acid anhydrides, alkyl and aryl esters (II, Y=halogen,

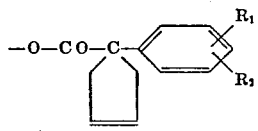

—O—CO—alkyl, —O—alkyl, —O—aryl and so on) can be reacted with an amino alcohol (III, Z=OH). The named reactive carboxylic acid derivatives can also be reacted with a metal compound of the amino alcohol (III, Z=O-Met, Met means a normal equivalent of a metal capable of forming an alcoholate, such as Na, K, Mg, Al and so on).

In all these cases the basic esters are obtained. In an analogous manner the basic amides are obtained when the carboxylic acids (II, Y=OH) or the functional derivatives thereof already mentioned are reacted with a diamine (III, Z=H$_2$N— or HN(alkyl)—).

A preferred method of carrying out the manufacture, which method is of general application, consists in bringing together 1-aryl-cyclopentene-(3)-1-carboxylic acid chloride (II, Y=Cl) with double the molecular quantity of amino-alcohol or diamine (III, Z=HO, H$_2$N or HN—(alkyl)) in an inert solvent, such as benzene. Reaction takes place even at room temperature; however, after the reaction has died down, it should be brought to completion by heating the mixture. If only one mol of amino alcohol or of diamine is used, then this method gives the hydrochloride of the basic ester or amide directly, its purity being in direct ratio to that of the starting materials.

The same compounds may also be prepared when a reactive ester of an amino-alcohol (III, e. g., Z=halogen, aryl—SO$_2$—O) is reacted with the carboxylic acid or a salt of the same (II, Y=OH or O-cation) (formation of the basic esters) or with a metal derivative of an amide of the carboxylic acid (II, Y=NH-metal or N(alkyl)-metal, whereby the alkali metal derivatives are particularly suitable as metal derivatives) (formation of the basic amides).

For example, the hydrochloride of the basic ester is obtained when the carboxylic acid (II, Y=OH) is heated with the chloralkylamine (III, Z=Cl) in an inert solvent, such as benzene or ethyl acetate. A suitable method of preparing the basic amide consists, e. g., in converting the carboxylic acid amide (II, Y=NH$_2$ or NH-alkyl) into the sodium derivative by heating with sodium amide in an inert solvent such as toluene and then reacting the sodium derivative with the chloralkylamine (III, Z=Cl) by heating.

A further process consists in reacting a reactive ester of a 1-aryl-cyclopentene-(3)-1-carboxylic acid-oxyalkyl ester or -oxyalkylamide, corresponding to Formula IV

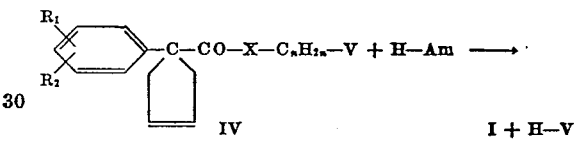

IV      I + H—V with a secondary, non-aromatic amine. In the above equation V stands for a reactive radical, e. g., halogen or —O—SO$_2$—aryl. If tertiary amines are used instead of secondary in this process, then the quaternary salts of the basic esters of Formula I are obtained.

The starting materials of Formula IV necessary for this process are obtained, for example, by the action of a 1-aryl-cyclopentene-(3)-1-carboxylic acid chloride on a compound of the formula H—X—C$_n$H$_{2n}$—V

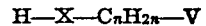

The new esters and amides of Formula I are bases which are practically insoluble in water. They form water-soluble salts, some of which crystallise well, with inorganic and organic acids commonly used for the production of salts used in therapeutics such as, e. g., hydrochloric acid, sulphuric acid, hydrobromic acid, phosphoric acid, acetic acid, citric acid, lactic acid, malic acid, mucic acid, succinic acid, maleic aid, methane-sulphonic acid, ethane-disulphonic acid. Furthermore they form quaternary salts, which readily dissolve in water, on the addition of reactive esters of aliphatic and araliphatic alcohols, such as alkyl chlorides, bromides and iodides, dialkyl sulphates or aralkyl chlorides, bromides and iodides, e. g., ethyl bromide, allyl bromide, dimethyl sulphate or benzyl chloride.

The esters and amides preparable according to the present invention are intended for use as therapeutics acting on the vegetative nervous system. They have the advantage over known similar compounds that their salts are more stable in aqueous solution. The anti-allergic action which is also a property of the majority of new compounds, is also of interest.

The basic esters and amides of the 1-aryl-cyclopentene-(3)-1-carboxylic acids as well as their salts can be converted into the corresponding derivatives of 1-aryl-cyclopentane-carboxylic acids by hydrogenation under conditions usual for the hydrogenation of a double bond, e. g., in the presence of nickel or noble metal catalysts.

Some of the more convenient ways of carrying out the processes of the invention, as well as a number of the preferred compounds preparable thereby are more closely described in the following examples and tables. Parts are parts by weight unless otherwise stated. The ratio of parts by weight to parts by volume is that of kilograms to litres. Temperatures are in degrees centigrade.

Example 1

1-phenyl-cyclopentene-(3)-1-nitrile

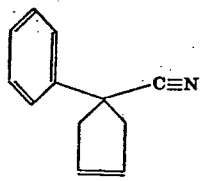

A suspension of 90 parts of sodium amide in 240 parts of absolute benzene is added in portions, while stirring and cooling well, to a solution of 132 parts of benzyl cyanide and 141 parts of 1,4-dichloro-butene-2 in 800 parts of absolute benzene. The reaction temperature should lie between —7 and 0°. Next the mixture is stirred for a further 10 to 20 hours at room temperature and water is then added. The benzene solution is separated by means of a separating funnel and washed in succession with 2 N sulphuric acid, 2 N caustic soda solution and with water. After drying with sodium sulphate the solvent is distilled off. The residue boils at 143.5–145.5° under 17 mm. pressure and is the nitrile of the above formula.

1,4-dichloro-butene-2 can be made from butene-diol by saturating with hydrogen chloride at 50°, separating off the water formed, washing with 2 N caustic soda and then with water, followed by drying and distillation. Its B. P. is 145–147°.

Instead of 1,4-dichloro-butene-2 the equivalent amount of 1,4-dibromo-butene-2 may also be used.

Absolute ether or toluene can be used instead of benzene as solvent.

The following are examples of compounds which can be prepared as described in Example 1:

General formula

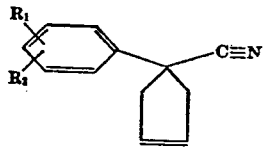

|   | $R_1$ | $R_2$ | B. P. | under pressure (in mm. Hg) |
|---|---|---|---|---|
| a | p-CH₃ | H | Degrees 155 –156 | 13 |
| b | m-CH₃ | H | 96 – 99 | 0.15 |
| c | o-CH₃ | H | 105 –106 | 0.07 |
| d | m-CH₃ | p-CH₃ | 167.5–170.5 | 12 |
| e | p-Cl | H | 102 –105 | 0.22 |
| f | o-Cl | m'-Cl | | |
| g | p-OCH₃ | H | 179 –181 | 12 |
| h | do | m-CH₃ | 123 –127 | 0.15 |
| i | –CH₂–CH₂–CH₂– | | 145 –147 | 0.18 |
| k | –CH₂–CH₂–CH₂–CH₂– | | 137 –145 | 0.18 |

Example 2

1-phenyl-cyclopentene-(3)-1-carboxylic acid

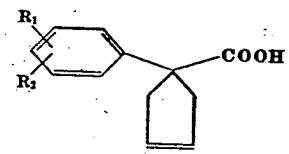

40 parts of 1-phenyl-cyclopentene-(3)-1-nitrile in 83 parts of methanol are heated with 25.5 parts of potassium hydroxide in 24 parts of water for 10 hours at 140–150°. After cooling, the solution is filtered, 100 parts of water are added and the methanol distilled off on the water-bath. Next the residue is acidified with 35% hydrochloric acid, the crude 1-phenyl-cyclopentene-(3)-1-carboxylic acid which precipitates out is filtered off under suction and washed with distilled water until the wash-water reacts neutral to litmus. The acid, recrystallised from a methanol-water mixture, melts at 128–129°.

Sodium hydroxide may also be used, instead of potassium hydroxide. The following are examples of acids which can be prepared as described in Example 2 above:

General formula

|   | $R_1$ | $R_2$ | M. P. | B. P. | under pressure (in mm. Hg) |
|---|---|---|---|---|---|
| a | p-CH₃ | H | Degrees 164–165 | Degrees | |
| b | m-CH₃ | H | 106–108 | | |
| c | o-CH₃ | H | | 156–160 | 0.15 |
| d | m-CH₃ | p-CH₃ | 140–141 | | |
| e | p-Cl | H | 136–138 | | |
| f | o-Cl | m'-Cl | | | |
| g | p-OCH₃ | H | 117–118 | | |
| h | do | m-CH₃ | 146–148 | | |
| i | –CH₂–CH₂–CH₂– | | 174–176 | | |
| k | –CH₂–CH₂–CH₂–CH₂– | | 151–153 | | |

Example 3

1-phenyl-cyclopentene-(3)-1-carboxylic acid-β-diethylamino-ethyl ester hydrochloride

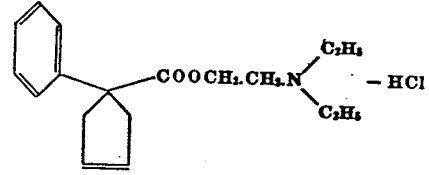

9.80 parts of 1-phenyl-cyclopentene-(3)-1-carboxylic acid are boiled for 12 hours under reflux with 13.40 parts of β-diethylamino-ethyl chloride-hydrochloride and 20 parts of anhydrous potassium carbonate in 40 parts of ethyl acetate. After cooling, water is added, the mixture separated in the separating funnel and the ethyl acetate solution extracted several times with 2 N hydrochloric acid. The base is separated from the lumped hydrochloric acid extracts by treatment with 10% caustic soda solution, taken up in ether and the ethereal solution dried with sodium sulphate. The oil remaining after distilling off the ether boils at 118–120° under 0.1 mm. pressure and is 1-phenyl-cyclopentene-(3)-1-carboxylic acid-β-diethylamino-ethyl ester.

By catalytic hydrogenation, e. g., with platinic oxide or Raney nickel, this compound can be converted into the already known 1-phenyl-cyclopentane-1-carboxylic acid-β-diethylamino-ethyl ester, B. P. 118–119° under 0.12 mm. pressure.

To prepare the hydrochloride, the base is dissolved in absolute ether and the equivalent quantity of ethereal hydrogen chloride solution is added. The hydrochloride is then filtered off under suction. After recrystallisation from an ethyl acetate-methanol mixture it melts at 163–164°. The hydrochloride of the above-mentioned hydrogenation product melts at 143–144°.

Example 4

1-phenyl-cyclopentene-(3)-1-carboxylic acid-β-diethylamino-ethylamide-hydrochloride

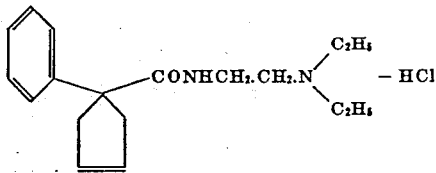

12.14 parts of 1-phenyl-cyclopentene-(3)-1-carboxylic acid chloride (B. P. 73–74° under 0.17 mm. pressure, prepared from the corresponding acid by treating with thionyl chloride) dissolved in 50 parts of absolute benzene are added to 7.50 parts of N,N-diethyl-ethylenediamine in 50 parts of absolute benzene, while cooling with ice. The mixture is then heated to boiling until the reaction is over (about ½ hour), cooled with ice and 10% caustic soda solution added. The reaction mixture is extracted with ether and the ethereal solution washed with water. Next the basic portions of the extract are removed by treatment with 2 N hydrochloric acid. The hydrochloric acid extract is made alkaline with 10% caustic soda solution and shaken up with ether. The ethereal solution is dried with sodium sulphate and evaporated down. The oil which remains boils at 143 to 145° under 0.15 mm. pressure and is the required base. The hydrochloride of this base, prepared by the process described in Example 3, melts at 145–147°.

Compounds disubstituted in the amido group can also be prepared by the above process. When a secondary-tertiary amine is used instead of a primary-tertiary one however, the reaction takes place rather more slowly so that it is necessary to heat for a longer time (4 to 8 times as long).

Example 5

4.32 parts of 1-phenyl-cyclopentene-(3)-1-carboxylic acid ethyl ester are heated, while excluding moisture, with 23.4 parts of anhydrous β-diethylamino-ethanol and 0.46 part of metallic sodium for two hours in the oilbath at 140–150° (oilbath temperature). The excess β-diethylaminoethanol and the ethyl alcohol formed are distilled off in vacuo and, when cold, the residue is taken up in ether. The ethereal solution is extracted with 2 N hydrochloric acid. The base is freed from the lumped hydrochloric acid extracts by adding 10% caustic soda solution, taken up in ether and the ethereal solution dried with sodium sulphate. After the ether has been distilled off on the water-bath a residue is left boiling at 124–126° under 0.18 mm. pressure. The product is the same as in Example 3, i. e., 1-phenyl-cyclopentene-(3)-1-carboxylic acid-β-diethylamino-ethyl ester. The melting point of the hydrochloride is 164–165°.

Example 6

1-(3',4'-dimethyl-phenyl)-cyclopentene-(3)-1-carboxylic acid-ε-diethylamino-amyl-ester.

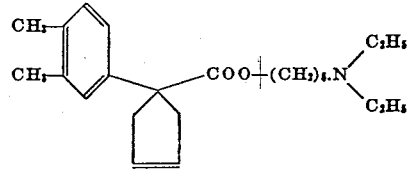

10.5 parts of the dry potassium salt of 1-(3',4'-dimethyl-phenyl)-cyclopentene-(3)-1-carboxylic acid (prepared by evaporating down a solution of 12 parts of the acid in 26.6 parts of 11.7% methyl alcoholic potassium hydroxide solution in vacuo, rubbing up the residue with acetone and filtering under suction) are heated for 15 hours at 90–100° with 95 parts of 1,5-dibromopentane. After cooling, the reaction mixture is shaken with ether and water, the separated ethereal solution is washed thrice more with water and dried with sodium sulphate. After distilling off the ether the residue is fractionated in vacuo. The boiling point of the product is 172–176° under 0.45 mm. pressure.

The greater part of the excess 1,5-dibromopentane is recovered in the first part of the distillate.

In a similar manner may be prepared the ε-bromo-amyl ester of 1-phenyl-cyclopentene-(3)-1-carboxylic acid which boils at 135–141° under 0.09 mm. pressure. Further, on using 1,4-dibromobutane instead 1,5-dibromo-pentane the product is the δ-bromo-butyl ester of 1-phenyl-cyclopentene-(3)-(1)-carboxylic acid. It boils at 127–140° under 0.18 mm. pressure.

13 parts of the ε-bromo-amyl-ester of 1-(3',4'-dimethyl-phenyl)-cyclopentene-(3)-1-carboxylic acid are heated with 13 parts of diethylamine in 100 parts by volume of absolute benzene for 6 hours in an autoclave at 100–110°. The benzene solution is then washed three times with water and 3 times with 2 N hydrochloric acid. The joint extracts are washed with ether and then made alkaline with 30% caustic soda solution, while cooling with ice. The bases are then extracted with ether and the residue, after distilling off the ether, is fractionated in vacuo. The product is 1-(3',4'-dimethylphenyl)-cyclopentene-(3)-1-carboxylic acid-ε-diethylamino-amyl ester, boiling at 164–165° under 0.19 mm. pressure. The melting point of the hydrochloride (after recrystallising from a mixture of ethyl acetate and methanol) is 124–125°.

In a similar manner may be prepared the ε-diethylamino-amyl ester of 1-phenyl-cyclopentene-(3)-1-carboxylic acid (B. P. 149–150° under 0.22 mm. presure, M. P. of hydrochloride 73–75°) and the δ-dimethyl-amino-butyl ester of 1-phenyl-cyclopentene-(3)-1-carboxylic acid (B. P. 120–125° under 0.1 mm. pressure, M. P. of hydrochloride 111–112°).

The following basic esters and amides may also be prepared by the methods given in the above examples and in the description:

General formula

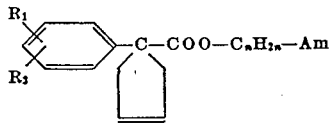

| No. | $R_1$ | $R_2$ | $C_nH_{2n}$ | Am | B. P. | under Pressure (mm. of Hg) | M. P. of Hydrochloride |
|---|---|---|---|---|---|---|---|
| 1 | H | H | —CH$_2$—CH$_2$— | —N(CH$_3$)$_2$ | *Degrees* 105–107 | 0.2 | *Degrees* 154–155 |
| 2 | H | H | do | —N(CH$_3$)(C$_2$H$_5$) | 107–110 | 0.12 | 149–151 |
| 3 | H | H | do | —N(CH$_2$—CH$_2$)$_2$CH$_2$ (piperidino) | 130–132 | 0.12 | 180–182 |
| 4 | H | H | do | —N(CH$_2$—CH$_2$)$_2$O (morpholino) | 146–150 | 0.09 | 173–174 |
| 5 | H | H | —(CH$_2$)$_3$— | —N(CH$_3$)$_2$ | 122–124 | 0.12 | 122–123 |
| 6 | H | H | do | —N(C$_2$H$_5$)$_2$ | 123–124 | 0.1 | 161–162 |
| 7 | H | H | do | —N(CH$_2$—CH$_2$)$_2$CH$_2$ | 139–140 | 0.1 | 179–180 |
| 8 | H | H | do | —N(CH$_2$—CH$_2$)$_2$O | 142–146 | 0.12 | 147–148 |
| 9 | H | H | —CH$_2$—CH(CH$_3$)— | —N(CH$_3$)$_2$ | 115–124 | 0.15 | 137–138 |
| 10 | H | H | —(CH$_2$)$_6$— | —N(CH$_2$—CH$_2$)$_2$O | 165–171 | 0.15 | 94–96 |
| 11 | p-CH$_3$ | H | —CH$_2$—CH$_2$— | —N(C$_2$H$_5$)$_2$ | 122–125 | 0.17 | 148–150 |
| 12 | do | H | do | —N(CH$_2$—CH$_2$)$_2$CH$_2$ | 137–138 | 0.1 | 170–171 |
| 13 | do | H | —(CH$_2$)$_3$— | —N(CH$_3$)$_2$ | 154–156 | 0.25 | 107–108 |
| 14 | m-CH$_3$ | H | —CH$_2$—CH$_2$— | —N(C$_2$H$_5$)$_2$ | 130–132 | 0.3 | 164–165 |
| 15 | do | H | —(CH$_2$)$_3$— | —N(CH$_3$)$_2$ | 131–133 | 0.3 | 125–126 |
| 16 | o-CH$_3$ | H | —CH$_2$—CH$_2$— | —N(C$_2$H$_5$)$_2$ | 123–125 | 0.19 | 154–156 |
| 17 | do | H | do | —N(CH$_2$—CH$_2$)$_2$O | 138–143 | 0.12 | 156–158 |

| No. | R₁ | R₂ | CₙH₂ₙ | Am | B. P. | under Pressure (mm. of Hg) | M. P. of Hydrochloride |
|---|---|---|---|---|---|---|---|
| 18 | p-CH₃ | m-CH₃ | do | —N(C₂H₅)₂ | Degrees 126–127 | 0.1 | Degrees 166–167 |
| 19 | do | m-CH₃ | —(CH₂)₃— | do | 133–136 | 0.2 | 149–150 |
| 20 | do | do | —CH₂—CH(CH₃)— | do | 140–142 | 0.17 | 156–157 |
| 21 | do | do | —(CH₂)₄— | do | 164–165 | 0.19 | 124–125 |
| 22 | p-OCH₃ | H | —(CH₂)₃— | morpholino (—N(CH₂CH₂)₂O) | 170–172 | 0.2 | 136–137 |
| 23 | do | m-CH₃ | —CH₂—CH₂— | —N(C₂H₅)₂ | 143–145 | 0.2 | 169–170 |
| 24 | p-Cl | H | do | —N(CH₃)₂ | 122–123 | 0.19 | 130–131 |
| 25 | —(CH₂)₄—(m,p) | | do | do | 143–145 | 0.15 | 156–158 |
| 26 | do | | do | —N(C₂H₅)₂ | 169–171 | 0.3 | 183–184 |
| 27 | —(CH₂)₃—(m,p) | | do | do | 147–150 | 0.18 | 163–164 |
| 28 | do | | —(CH₂)₄— | do | 176–179 | 0.3 | 122–123 |

General formula

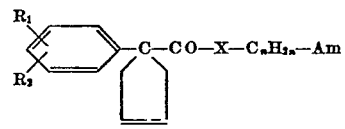

| No. | R₁ | R₂ | X | CₙH₂ₙ | Am | B. P. | under Press. (mm. of Hg) | M. P. of Hydrochloride |
|---|---|---|---|---|---|---|---|---|
| 29 | H | H | —NH— | —CH₂—CH₂— | —N(CH₃)₂ | Degrees 128–130 | 0.15 | Degrees 148–149 |
| 30 | H | H | do | do | —N(CH₃)(C₂H₅) | 140–141 | 0.22 | 126–127 |
| 31 | H | H | do | do | piperidino (—N(CH₂CH₂)₂CH₂) | 147–152 | 0.13 | 149–151 |
| 32 | H | H | —N(CH₃)— | do | —N(CH₃)₂ | 126–130 | 0.15 | 214–215 |
| 33 | H | H | do | do | —N(C₂H₅)₂ | 135–140 | 0.2 | 149–151 |
| 34 | p-CH₃ | H | —NH— | do | do | 153–157 | 0.15 | 166–167 |
| 35 | do | H | —N(CH₃)— | do | do | 152–153 | 0.2 | 124–125 |
| 36 | m-CH₃ | H | —NH— | do | do | 148–154 | 0.3 | 160–161 |
| 37 | o-CH₃ | H | do | do | do | 132–135 | 0.2 | 159–161 |

| No. | R₁ | R₂ | X | C_nH_{2n} | Am | B. P. | under Press. (mm. of Hg) | M. P. of Hydrochloride |
|---|---|---|---|---|---|---|---|---|
| 38 | p-CH₃ | m-CH₃ | —N—<br>C₂H₅ | do | do | *Degrees*<br>144-145 | 0.12 | *Degrees*<br>117-118 |
| 39 | p-OCH₃ | H | —NH— | do | —N(CH₃)(CH₃) | 160-161 | 0.2 | 147-148 |
| 40 | do | H | —N—<br>CH₃ | —(CH₂)₃— | —N(C₂H₅)(C₂H₅) | 147-149 | 0.05 | hygroscop. |
| 41 | p-Cl | H | —N—<br>C₂H₅ | —CH₂—CH₂— | do | 157-161 | 0.3 | do |
| 42 | —(CH₂)₃—(m,p)—NH— | | | do | do | 164-166 | 0.17 | 177-178 |

Further compounds which may be prepared as described hereinbefore are, e. g., 1-(4'-chloro-phenyl) - cyclopentene-(3)-1-carboxylic acid-γ-dimethylamino-hexyl ester,
1-indanyl-(5') - cyclopentene - (3)-1-carboxylic acid-β-(methyl-ethyl-amino)-ethyl ester,
1-indanyl-(5')-cyclopentene - (3) - 1 - carboxylic acid-δ-dimethyl amino-butyl ester,
1-phenyl-cyclopentene - (3)-1 - carboxylic acid-ethyl-(β-morpholino-ethyl)-amide,
1-phenyl - cyclopentene-(3)-1-carboxylic acid-methyl-(γ-piperidino-propyl)-amide,
1-(4'-chloro-phenyl) - cyclopentene - (3)-1-carboxylic acid-β-diethyl-amino-ethyl-amide,
1-(3',4'-dimethyl-phenyl) - cyclopentene-(3)-1-carboxylic acid-γ - dimethyl - amino - propylamide,
1-(4' - methoxy - phenyl)-cyclopentene - (3)-1-carboxylic acid-γ-diethyl-amino-propylamide,
1-(3'-methyl - 4'-methoxy - phenyl)-cyclopentene-(3)-1-carboxylic acid-ethyl - (β-diethylamino-ethyl)-amide,
1-indanyl-(5')-cyclopentene - (3)-1 - carboxylic acid-methyl-(β-dimethylamino - ethyl)-amide.

What we claim is:

1. A compound of the formula

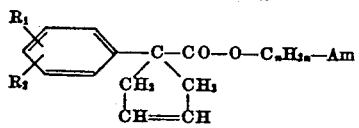

wherein R₁ and R₂ each represents a member selected from the group consisting of a hydrogen atom, a halogen atom, a methyl and a methoxy group and, joined together, a trimethylene and a tetramethylene radical, n represents an integer from 2 to 6, and Am represents a member selected from the group consisting of a di-(lower-alkyl)-amino, a morpholino and a piperidino radical.

2. The compound of the formula

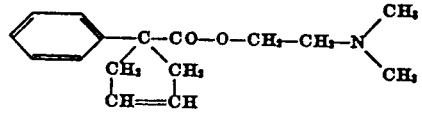

3. The compound of the formula

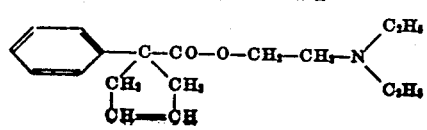

4. The compound of the formula

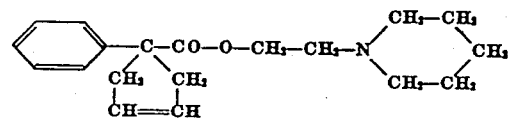

5. The compound of the formula

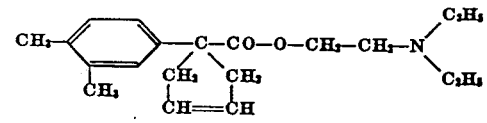

6. The compound of the formula

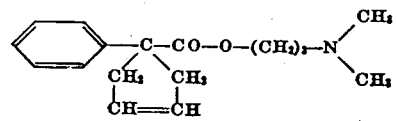

FRANZ HÄFLIGER.
ROLF DENSS.

REFERENCES CITED

The following references are of record in the file of this patent:

UNITED STATES PATENTS

| Number | Name | Date |
|---|---|---|
| 1,985,601 | Dahlen et al. | Dec. 25, 1934 |
| 2,063,144 | Barrett et al. | Dec. 8, 1936 |
| 2,228,256 | Christiansen | Jan. 14, 1941 |
| 2,387,447 | Hoffman et al. | Oct. 23, 1945 |
| 2,400,433 | Natelson et al. | May 14, 1946 |
| 2,417,773 | Martin et al. | Mar. 18, 1947 |
| 2,425,723 | Blicke et al. | Aug. 19, 1947 |
| 2,437,545 | Martin et al. | Mar. 9, 1948 |
| 2,441,128 | Barrick et al. | May 11, 1948 |
| 2,447,361 | Peek et al. | Aug. 17, 1948 |
| 2,474,796 | Van Campen et al. | June 28, 1949 |
| 2,496,064 | Natelson et al. | Jan. 31, 1950 |

FOREIGN PATENTS

| Number | Country | Date |
|---|---|---|
| 532,943 | Great Britain | Feb. 4, 1941 |
| 61,463 | Denmark | Oct. 25, 1943 |
| 234,452 | Switzerland | Jan. 16, 1945 |
| 240,162 | Switzerland | May 16, 1946 |
| 242,245 | Switzerland | Oct. 16, 1946 |